Sept. 28, 1948.　　　　L. A. DE ROSA　　　　2,449,982
RADIO BEACON
Filed June 12, 1944　　　　　　　　3 Sheets-Sheet 1
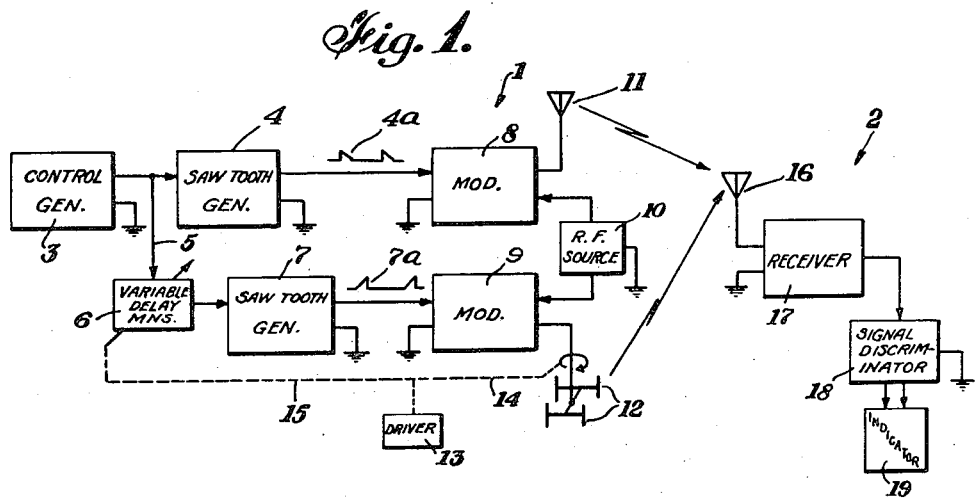
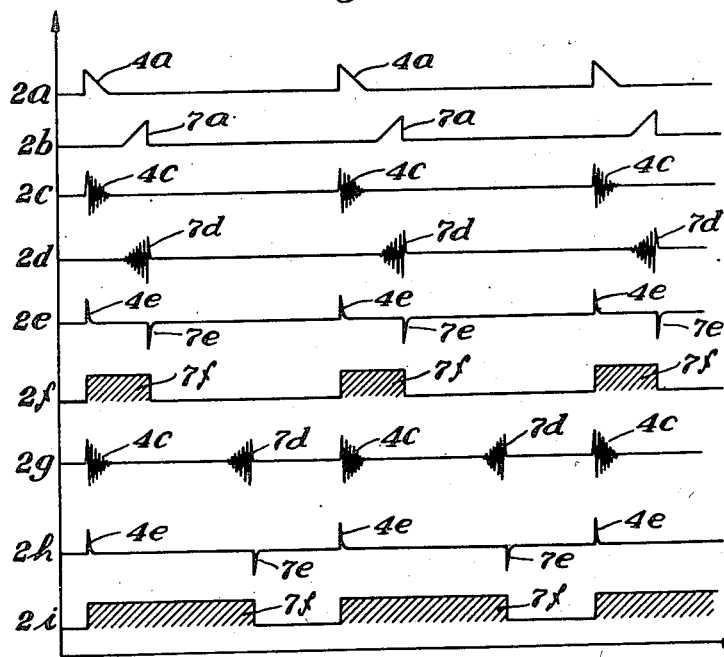
INVENTOR.
LOUIS A. DE ROSA
BY
R. P. Morris
ATTORNEY Sept. 28, 1948.                L. A. DE ROSA                2,449,982
                                RADIO BEACON
Filed June 12, 1944                                      3 Sheets-Sheet 2
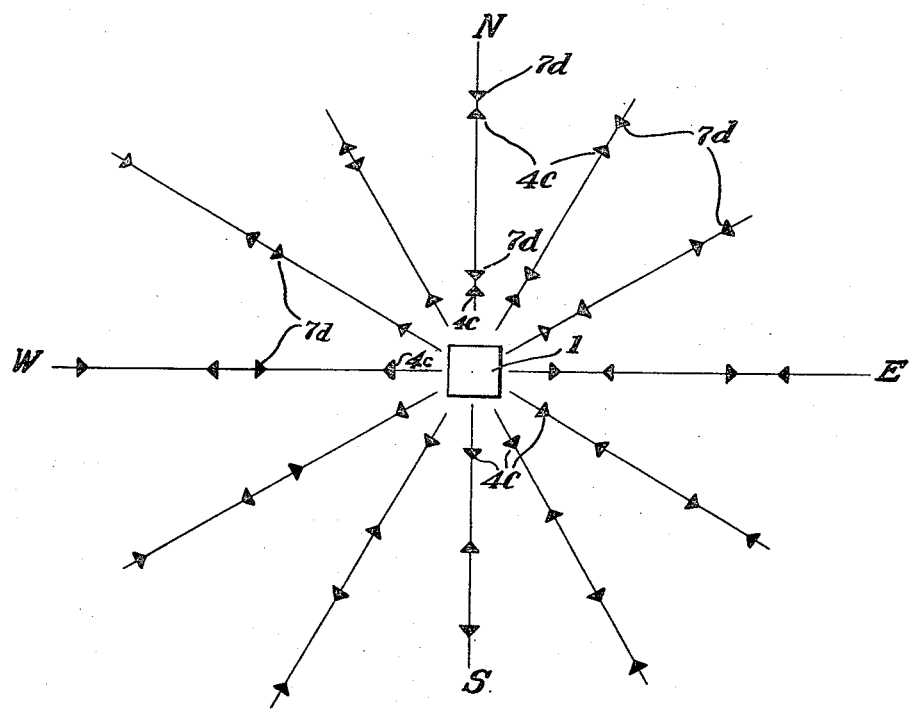
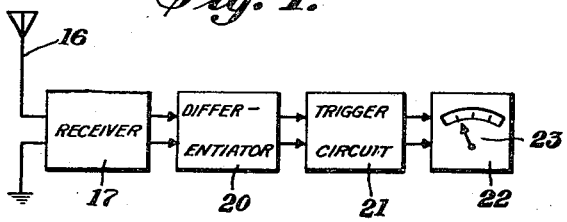
INVENTOR.
LOUIS A. DE ROSA
BY
ATTORNEY Patented Sept. 28, 1948

2,449,982

UNITED STATES PATENT OFFICE 2,449,982

RADIO BEACON

Louis A. de Rosa, Staten Island, N. Y., assignor to Federal Telephone and Radio Corporation, New York, N. Y., a corporation of Delaware Application June 12, 1944, Serial No. 539,815

18 Claims. (Cl. 343—106)

1

This invention relates to radio beacons for aircraft and more particularly to radio beacons of the type in which a plurality of courses around the radio beacon may be defined.

In order that craft may follow any one of a plurality of courses to approach a beacon from any direction, a number of radio beacons generally termed omnidirectional radio beacons, have been developed. One form of omnidirectional beacon is provided by rotating a directive pattern carrying a first signal around a fixed point and transmitting an omnidirectional second signal from the beacon at the moment when the directive pattern passes through a single particular reference direction such as the North. In this type of beacon, it is necessary that some sort of timing means be provided, so that the elapsed time between receipt of the omnidirectional signal and the maximum directive signal, will indicate to the pilot which of the courses he is following.

It is an object of my invention to provide a so-called omnidirectional beacon, utilizing a rotated directive pattern and an omnidirectional pattern, in which timing of periods defined by a particular reference direction and receipt of the strongest signal is not necessary.

It is a further object of my invention to provide a beacon system wherein an omnidirectional radiation pattern of pulses timed in a predetermined manner is periodically transmitted, and a directive radiation pattern characterized by other pulses variable in timing is transmitted in accordance with the rotation of the directive pattern, whereby the spacing between the pulses transmitted in the omnidirectional pattern and in the directive pattern will furnish an indication of the course line to be followed.

It is a still further object of my invention to provide an omnidirectional beacon method for defining guiding courses about the beacon, in which the various courses are identified by the timing between a set of regularly timed transmitted pulses and a second set of pulses variably timed with respect to the first set, in accordance with directive displacement of the radiation pattern of the second set about said beacon.

In accordance with a feature of my invention, I provide a radio beacon wherein a series of pulses having a predetermined characteristic are transmitted from a first radiating means in a predetermined time relationship. A second series of pulses is radiated from a directive radiator, the directive radiation pattern from this radiator being rotated about said beacon at a

2 predetermined rate. From this second radiator are transmitted a series of pulses differently characterized than said first series of pulses and variably timed with respect to said first pulses in successively different directions about said beacon, whereby a series of courses is defined by the difference in the spacing of the pulses of said two series about said beacon. A receiving circuit is provided for receiving both series of pulses and discriminating between the two sets. An indicator operative in response to these discriminated signals serves to indicate the course upon which the receiver is located. It is thus merely necessary to keep the indication constant on the receiving apparatus in order to follow the beacon course toward or away from the beacon station.

A better understanding of my invention and the features and objects thereof may be had from the particular description made with reference to the accompanying drawings in which;

Fig. 1 is a block circuit diagram of a beacon transmitter and receiver circuit in accordance with my invention;

Fig. 2 is a set of pulse diagrams used for explaining the operation of a beacon incorporating the features of my invention;

Fig. 3 is a diagrammatic pattern illustrating the variation in pulse spacing around a radio beacon in accordance with the features of my invention;

Figs. 4 and 5 are modified receiver arrangements constructed particularly to cooperate with a radio beacon in accordance with my invention, and;

Figure 5:
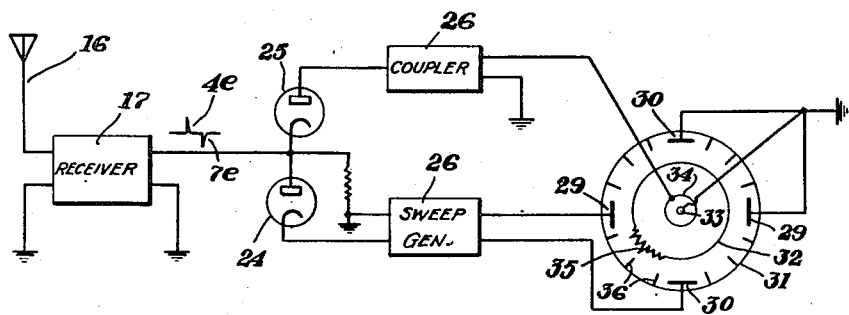

Turning first to Fig. 1, there is illustrated at 1 a beacon station and at 2, a receiver station. At the transmitter station, a control generator 3 is used to control a first pulse generator 4 which may be in the form of a saw-tooth generator producing a series of pulses, as shown at 4a. Generator 3 serves simultaneously to supply a control wave over line 5 and variable delay means 6 to a second pulse generator 7 which may likewise be a saw-tooth generator producing another train of saw-tooth pulses 7a reversed in slope with respect to pulses 4a. Pulses 4a and 7a may be applied to modulators 8 and 9, respectively, which are supplied with a common radio frequency from radio frequency source 10. The output of modulator 8 is coupled to an omnidirectional radiator 11 while the output of modulator 9 is coupled to a directive antenna array 12. Antenna 12 may be continuously rotated by means of a driver 13 and driving means 14, so that the directive pattern from radiator 12 is continuously rotated about the radio beacon 1. Simultaneously, with rotation of antenna 12, driver 13 may serve to adjust variable delay means 6 over control linkage 15, so that the delay of pulses 7a may be made to vary with respect to pulses 4a successively around the circle upon which the directive pattern is rotated. It will thus be seen that as antenna 12 is rotated, the effective spacing in each successive direction between pulses 4a and pulses 7a will continuously vary. These variably spaced pulses may be received on a common receiving antenna 16 and applied to a receiver 17 which may serve to receive and detect pulses of both series. These detected pulses may then be applied over a signal discriminator 18 which serves to separate the two types of pulses 4a and 7a and apply them to an indicator, such as shown at 19. Indicator 19 may be calibrated to show the various courses which may be defined at various points about the radio beacon.

Turning now to Fig. 2 the pulses, such as shown at 4a, may be in the form shown in curve 2a in which the saw-tooth waves have a sharp leading edge and a gradual decreasing trailing edge. These pulses are preferably timed in a predetermined manner as they are transmitted from antenna 11. The pulses 7a may have an envelope form, as shown at curve 2b in Fig. 2, so that they have a gradually increasing leading edge and a sharp trailing edge. In curve 2c the radio frequency pulses from the output of a modulator such as shown at 8, may take the form of 4c, as shown, while in curve 2d, pulses 7a after keying modulator 9 will take the form 7d. These pulses, as received in receiver 17, may be detected to reproduce pulse envelopes such as shown at 4a and 7a. These pulse envelopes may then be passed through some form of discriminator, such as a differentiating network providing sets of positive and negative impulses 4e, 7e, as shown in curve 2e. These sets of pulses after differentiation may be used to produce an indicating output wave. For example, the pulses may be made to operate some form of triggering circuit to produce the rectangular pulses 7f, shown at curve 2f. The length of these pulses is equal to the spacing between pulses 4e and 7e of curve 2e. Indicator 19 may, therefore, be a meter which will integrate these pulses and produce a meter displacement depending upon the total energy defined by pulses 7f. In a different direction, the pulses such as shown at 7d (see curve 2g), will be displaced differently with respect to pulses 4c producing differently spaced pulses 4e, 7e, (see curve 2h) which will provide for other pulses 7f of longer duration (see curve 2i) which will produce a different meter reading.

Turning now to Fig. 3, the radio beacon 1 is shown with the respective different effective radiation pulse spacings produced in different directions about the beacon. Pulses 4c, for example, are shown occurring at equally timed intervals about beacon station 1, while the pulses 7d increase in the spacing clockwise progressively around beacon station 1 from N to E to S to W and back to N where the spacing cycle is again repeated. It will thus be seen that a craft may select any desired course and by maintaining the craft along a line in which pulses 7d, 4c are of constant spacing, may follow a given course line to or from beacon 1. The variable delay means 6 may be made to adjust the delay in steps in timed relation with a stepped movement of antenna 12 or may be made continuously variable together with a continuous rotation of antenna 12.

It will be noted that in the arrangement illustrated in Fig. 3, different spacings are provided along the course lines approaching beacon 1 from opposite directions. In some cases, it may be suitable to provide merely a line of direction passing over a beacon station 1, without necessitating a discrimination between diametrically opposed courses. In such a case, the variable delay means may be such as to increase the effective delay of pulses 7d during 180° rotation period of antenna 12 and then similarly produce a decrease in delay during the next 180° rotation period.

It should further be understood that while I have illustrated a rotating antenna 12 as a means for rotating the directive radiation pattern, any other known form and system for rotating such directive patterns may be used. For example, in cases where the antenna is too large to be readily rotated, the well known goniometer construction may be used for this purpose. Likewise, fixed antennas with variable phase shifting circuits to cause effective rotation of the pattern, may be used, if desired.

In Fig. 4 is shown a simple block diagram of a receiving circuit operative to produce indications of the type shown in Fig. 2. In this arrangement the receiving antenna 16 is coupled to a receiver 17 which serves to receive and detect the pulses. The detected pulses may be applied to a differentiator 20 which serves to produce positive and negative pulses such as 4e and 7e of Fig. 2. These pulses may be applied to trigger circuit 21 producing rectangular output pulses such as shown at 7f of Fig. 2. A meter 22 may then be provided, suitably calibrated to produce the displacement of its pointer 23 in accordance with the total energy received.

Figure 6:
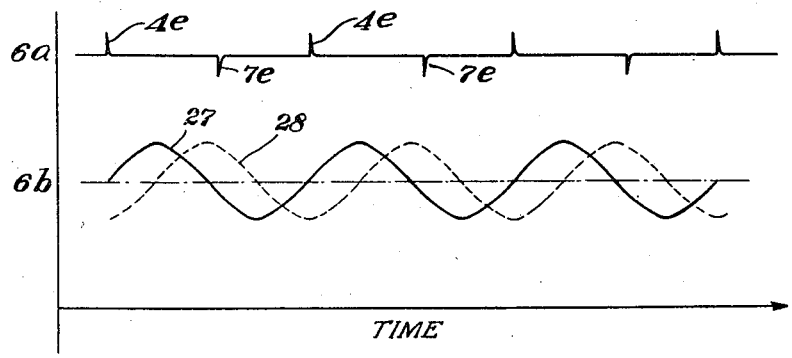
Fig. 6 is a set of curves used in explaining the operation of the indicator shown in Fig. 5.

In Fig. 5 is illustrated an alternative receiver arrangement in which the pulses may be discriminated in a different manner. In this circuit antenna 16 is coupled to a receiver 17 which may include a differentiating circuit as well as a detector, producing in the output pulses 4e and 7e. Coupled to the output of receiver 17 are provided two rectifiers 24 and 25 which serve to pass pulses 4e and 7e, respectively. The pulses 4e passed by rectifier 24 are applied to sweep generator 26 which may serve to produce a pair of waves displaced 90° with respect to one another, as shown in Fig. 6, curve 6b at 27, 28. These output waves 27, 28 may be applied to deflector electrodes 29, 30 of a cathode ray indicator 31 serving to rotate the cathode ray beam producing a circular trace 32 on the screen. As can be seen by reference to curve 6a of Fig. 6, waves 27 and 28 correspond in frequency to the spacing of pulses 4e so that one circular trace is produced on the cathode ray screen for each of the received omnidirectional pulses. The pulses 7e are applied over rectifier 25 and coupler 37 to other deflecting electrodes 33, 34 of cathode ray indicator 31 producing a series of deflections 35 in sweep line 32. These deflections produce in effect a pointer pointing to scale indications 36 on the screen of tube 31 indicating the course position of the craft. By aligning the maximum of indications 35 with the desired course indication and maintaining this alignment, the craft may maintain its course relative to the radio beacon.

It is clear that other types of indicators responsive to pulses of definite characteristics will readily occur to those skilled in the art. Furthermore, it will be clear that instead of providing triangular pulses to distinguish one from another, as shown in the principal example, other pulse characteristics may be used to provide the desired discrimination between signals. For example, the pulses may be different in width, in which case the discriminator circuit at the receiver may be any known form of width selecting device. Furthermore, any other type of characteristic that will serve readily to permit distinction and discrimination between the received pulses may be used.

It should be distinctly understood that the specific circuits described herein are shown merely by way of illustration and are not to be considered as a limitation on the scope of my invention as set forth in the objects thereof and in the accompanying claims.

I claim:

1. A radio beacon comprising a first means for radiating a series of substantially uniformly spaced pulses at a predetermined timing and repetition rate in a substantially uniformly distributed pattern, means for radiating a second series of pulses at said predetermined repetition rate in a directive pattern, means for moving said directive pattern successively into different directions and means for variably timing said second series of pulses with respect to said series first named in accordance with the successive different directions to present successively different time relations between pulses of said series in the successive different directions.

2. In a radio beacon, the method of providing different guiding courses about said beacon, comprising radiating a first series of pulses with substantially uniform repetition rate and a predetermined timing in a substantially uniform pattern about said beacon, radiating a second series of pulses at said uniform repetition rate in a directive pattern, rotating said directive pattern about said beacon, and variably timing the pulses of said second series with respect to said first series in successively different directions to provide a different timing in different directions about said beacon, whereby said different courses are defined by differences in said pulse spacings.

3. A radio beacon comprising a first radiating means having substantially uniform radiation characteristics in a given plane, a second radiating means having a directive pattern in said given plane, means for producing a rotary movement of said directive pattern, means for energizing said first radiation means with a first series of pulses having a predetermined repetition rate, means for energizing said second radiation means with a second series of pulses, and means for adjusting the spacing of said second series of pulses with respect to the pulses of said first series in synchronism with rotation of said directive pattern to provide successively different spacings in the different rotary positions of said directive pattern.

4. A radio beacon according to claim 3 wherein means is provided for giving to the pulses of said first series and the pulses of said second series different distinguishing characteristics.

5. A radio beacon according to claim 3 further comprising means for shaping the pulses of said first and second series to provide a sharp leading edge and a gradually decreasing trailing edge for the pulses of one series, and a gradually increasing leading edge and a sharp trailing edge for the pulses of the other series.

6. A multiple course radio beacon system, comprising a radio beacon including means for radiating a first series of pulses of predetermined timing substantially uniformly about said beacon, means for radiating a second series of pulses successively directively along each of said courses, and means for variably timing the pulses of said second series with respect to the pulses of said first series to provide successively different spacings of said pulses along successively different courses.

7. A system according to claim 6 further comprising receiver means for receiving said pulses, and means for producing an indication of the timing between said received pulses to indicate a course line.

8. A system according to claim 6 further comprising means for shaping the pulses of said first and second series to provide sharp leading edges and gradually decreasing trailing edges for the pulses of one series and gradually increasing leading edges and sharp trailing edges for the pulses of the other series.

9. A system according to claim 6, further comprising receiver means for receiving said radiated pulses, discriminator means for discriminating between the pulses of said first and second series, and indicator means for producing an indication of the spacing relation of said received pulses of said first and second series to define a course line.

10. A multiple course radio beacon system, comprising a radio beacon including means for radiating a first series of pulses of predetermined timing substantially uniformly about said beacon, means for radiating a second series of pulses successively directively along each of said courses, means for variably timing the pulses of said second series with respect to the pulses of said first series to provide successively different spacings of said pulses along successively different courses, and means for shaping the pulses of said first and second series to provide sharp leading edges and gradually decreasing trailing edges for the pulses of one series and gradually increasing leading edges and sharp trailing edges for the pulses of the other series; and a cooperating radio receiver including means for receiving said radiated pulses, discriminator means for discriminating between the pulses of said first and second series, and indicator means for producing an indication of the course line represented by the relation of said received pulses of said first and second series.

11. A system according to claim 10, wherein said discriminator means comprises a differentiating means for producing relatively narrow impulses of different polarity in response to said sharp leading and trailing edges, and said indicator means comprises means differently responsive to said positive and negative impulses.

12. A system according to claim 10, wherein said discriminator means comprises a differentiating means for producing relatively narrow impulses of different polarity in response to said sharp leading and trailing edges, and said indicator means comprises a trigger circuit operative in opposite directions in response to said positive and negative impulses to produce waves having a duration substantially proportional to the time spacing of the pulses received, and a meter for measuring the energy output from said trigger circuit.

13. A system according to claim 10, wherein said discriminator means comprises a differentiating means for producing relatively narrow impulses of different polarity in response to said sharp leading and trailing edges, and said indicator means comprises a cathode ray indicator, a sweep generator responsive to said impulses of one polarity for producing a sweep control potential to sweep the beam of said indicator over a given path during the interval between successive ones of said impulses of said one polarity and deflection means responsive to said impulses of the other polarity for causing deflection of said beam at a point on said sweep corresponding to said timing.

14. A system according to claim 10, wherein said discriminator means comprises a differentiating means for producing relatively narrow impulses of different polarity in response to said sharp leading and trailing edges, and said indicator means comprises means for producing a rotary indication movement, means for synchronizing said movement in response to said impulses of one polarity and means for producing a radial indication cooperating with said rotary indication movement in response to said impulses of the other polarity.

15. A radio beacon comprising a first means for radiating a series of spaced pulses in a substantially uniformly distributed pattern, means for radiating a second series of pulses in a directive pattern, means for moving said directive pattern successively into different directions, and means for variably timing said first and second series of pulses with respect to each other in accordance with successive different directions to present successively different time relations between pulses of said series in the successive different directions.

16. In a radio beacon, the method of providing different guiding courses about said beacon, comprising radiating a first series of pulses in a substantially uniform pattern about said beacon, radiating a second series of pulses in a directive pattern, rotating said directive pattern about said beacon, and variably timing the pulses of said first and second series with respect to one another in successively different directions to provide a different timing in different directions about said beacon.

17. A radio beacon comprising an omni-directional antenna and a directive antenna, a source of control signals, a reference saw-tooth generator and modulator and a direction indicating saw-tooth generator and modulator circuit, a radio frequency signal source, a variable delay circuit for time delaying applied signals, means for applying said control signals to said reference saw-tooth generator and through said variable delay circuit to said direction indicating saw-tooth generator, means for applying said saw-tooth generator outputs to respective modulator circuits, means for applying said radio frequency signals to said modulator circuits, means for applying the output of said reference modulator to said omni-directional antenna, means for applying the output of said direction indicator modulator to said directive antenna, driving means, the degree of time delay of said variable delay circuit being synchronized with the rotation of said directive antenna under control of said driving means, whereby in accordance with successive different directions of transmission of said directive antenna, reference pulses and direction indicating pulses having a different time spacing are produced.

18. In a direction finder receiver for the comparison of reference pulses transmitted by a directional antenna and direction indicating pulses transmitted by a rotating directive antenna system wherein the spacing between said reference and direction indicating pulses is varied in accordance with the direction of transmission of the directive antenna system, means for receiving said transmitted pulses, means for separating said pulses, a cathode ray oscillograph, means for producing sweep voltages timed with said separated reference pulses, means for applying said sweep voltages to the deflection electrodes of the cathode ray oscillograph to rotate the cathode ray beam and produce a circular trace on the screen thereof, means for applying said separated direction indicating pulses to the control electrode of said oscillograph to produce a deflection of said circular trace.

LOUIS A. DE ROSA.

REFERENCES CITED

The following references are of record in the file of this patent:

UNITED STATES PATENTS

| Number | Name | Date |
| --- | --- | --- |
| 2,406,468 | Loughlin | Aug. 27, 1946 |

FOREIGN PATENTS

| Number | Country | Date |
| --- | --- | --- |
| 113,998 | Australia | Oct. 7, 1941 |